US011544338B2

(12) United States Patent
Shreyas et al.

(10) Patent No.: US 11,544,338 B2
(45) Date of Patent: *Jan. 3, 2023

(54) GROUPING CONTENT BASED ON GEOGRAPHIC DATA

(71) Applicant: META PLATFORMS, INC., Menlo Park, CA (US)

(72) Inventors: Dhaval Parswanath Shreyas, San Jose, CA (US); William M. Ruben, San Francisco, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,771

(22) Filed: Jun. 15, 2020

(65) Prior Publication Data

US 2020/0314166 A1 Oct. 1, 2020

Related U.S. Application Data

(63) Continuation of application No. 15/170,719, filed on Jun. 1, 2016, now Pat. No. 10,715,580.

(51) Int. Cl.
*G06F 16/00* (2019.01)
*G06F 16/9537* (2019.01)
(Continued)

(52) U.S. Cl.
CPC ......... *G06F 16/9537* (2019.01); *H04L 67/06* (2013.01); *H04L 67/52* (2022.05);
(Continued)

(58) Field of Classification Search
CPC ..... G06F 16/9537; H04L 67/06; H04L 67/18; H04L 67/20; H04L 67/22; H04L 69/28
(Continued)

(56) References Cited

U.S. PATENT DOCUMENTS 8,655,983 B1 2/2014 Harris et al.
8,995,716 B1 3/2015 Zomet et al.
(Continued)

OTHER PUBLICATIONS

Office Action for U.S. Appl. No. 15/170,719, dated Jul. 13, 2018, 18 pages.

(Continued)

*Primary Examiner* — Michelle N Owyang
(74) *Attorney, Agent, or Firm* — Jordan IP Law, LLC

(57) ABSTRACT

A method includes detecting content items stored locally on a client device, each content item including a time stamp and geospatial metadata; identifying one or more sets of content items based on their time stamps being within a first predetermined time range; determining, for each set of content items, a geographic location associated with the content items of the set based on the geospatial metadata of each content item; generating a list of all geographic locations associated with the sets of content items; selecting subsets of content items based on determining that the time stamps associated with each content item of the subset are within a second predetermined time range; determining, from the selected subsets of content items, non-overlapping subsets of content items based on a parent geographic location associated with the selected subset; and sending instructions to categorize content items into the non-overlapping subsets of content items.

17 Claims, 12 Drawing Sheets

(51) Int. Cl.
  *H04L 67/06* (2022.01)
  *H04L 69/28* (2022.01)
  *H04L 67/52* (2022.01)
  *H04L 67/53* (2022.01)
  *H04L 67/50* (2022.01)

(52) U.S. Cl.
  CPC ............ *H04L 67/53* (2022.05); *H04L 67/535* (2022.05); *H04L 69/28* (2013.01)

(58) Field of Classification Search
  USPC .................................................. 707/705–780
  See application file for complete search history.

(56) References Cited

U.S. PATENT DOCUMENTS

| | | | |
|---|---|---|---|
| 9,947,022 | B1 | 4/2018 | Shariff et al. |
| 10,445,359 | B2 * | 10/2019 | Bjarnestam ............. G06F 16/48 |
| 2009/0248688 | A1 | 10/2009 | Kim et al. |
| 2013/0110927 | A1 | 5/2013 | Marra et al. |
| 2013/0290332 | A1 | 10/2013 | Carlsson et al. |
| 2014/0143247 | A1 | 5/2014 | Rathnavelu et al. |
| 2015/0039616 | A1 | 2/2015 | Rolston et al. |
| 2015/0050921 | A1 | 2/2015 | Chu et al. |
| 2015/0052020 | A1 | 2/2015 | Raman et al. |
| 2015/0066897 | A1 * | 3/2015 | Vronay ................. G06F 16/435 707/710 |
| 2015/0363640 | A1 | 12/2015 | Meyer |
| 2016/0357785 | A1 | 12/2016 | Titi et al. |
| 2017/0180511 | A1 * | 6/2017 | Mormile ................. H04L 67/30 |
| 2017/0185869 | A1 | 6/2017 | Dua et al. |

OTHER PUBLICATIONS

Office Action for U.S. Appl. No. 15/170,719, dated Feb. 19, 2019, 18 pages.
Office Action for U.S. Appl. No. 15/170,719, dated Aug. 16, 2019, 21 pages.
Office Action for U.S. Appl. No. 15/170,719, dated Dec. 20, 2019, 22 pages.
Notice of Allowance for U.S. Appl. No. 15/170,719, dated Mar. 11, 2020, 5 pages.

* cited by examiner

GROUPING CONTENT BASED ON GEOGRAPHIC DATA

PRIORITY

The present application claims the benefit of priority to U.S. Non-Provisional patent application Ser. No. 15/170,719 (filed on Jun. 1, 2016), the disclosure of which is incorporated herein in its entirety.

TECHNICAL FIELD

This disclosure generally relates to facilitating the sharing of content between users of an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the communication system may detect, on a client system associated with a first user, a plurality of content items stored locally on the client device, wherein each content item comprises a time stamp and geospatial metadata, and identify one or more sets of content items from the plurality of content items based on the time stamps of the content items. Each set of content items may comprise one or more content items, and each content item in each set of content items may have a time stamp within a first predetermined time range. Then, the communication system may determine, for each set of content items, a geographic location associated with the one or more content items of the set based on the geospatial metadata of each content item, and generate a list of all geographic locations associated with the one or more sets of content items, each listed geographic location being associated with a subset of content items. Then, the communication system may select one or more of the subsets of content items based on determining that the time stamps associated with each content item of the subset are within a second predetermined time range, the second predetermined time range being different from the first predetermined time range. Then, the communication system may determine, from the selected subsets of content items, one or more non-overlapping subsets of content items based on a parent geographic location associated with the selected subset. Then, the communication system may send, to the client system, instructions to categorize the plurality of content items into one or more of the non-overlapping subsets of content items.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

System Overview

Figure 1:
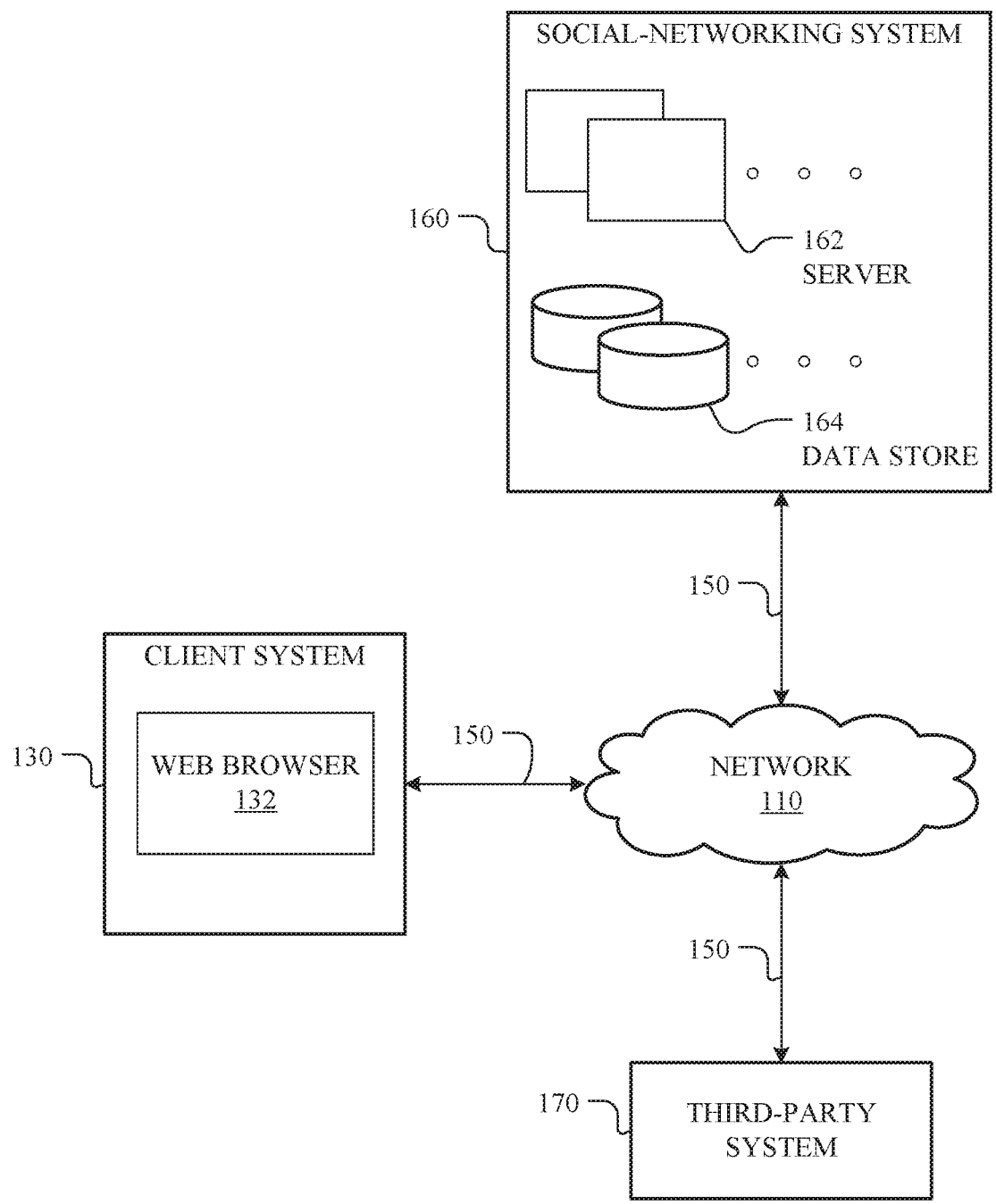
FIG. 1 illustrates an example network environment associated with a social-networking system.

FIG. 1 illustrates an example network environment 100 associated with a communication system. As an example and not by way of limitation, the communication system may include a social-networking system, a messenger system, other suitable communications systems, or any combination thereof. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110. This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
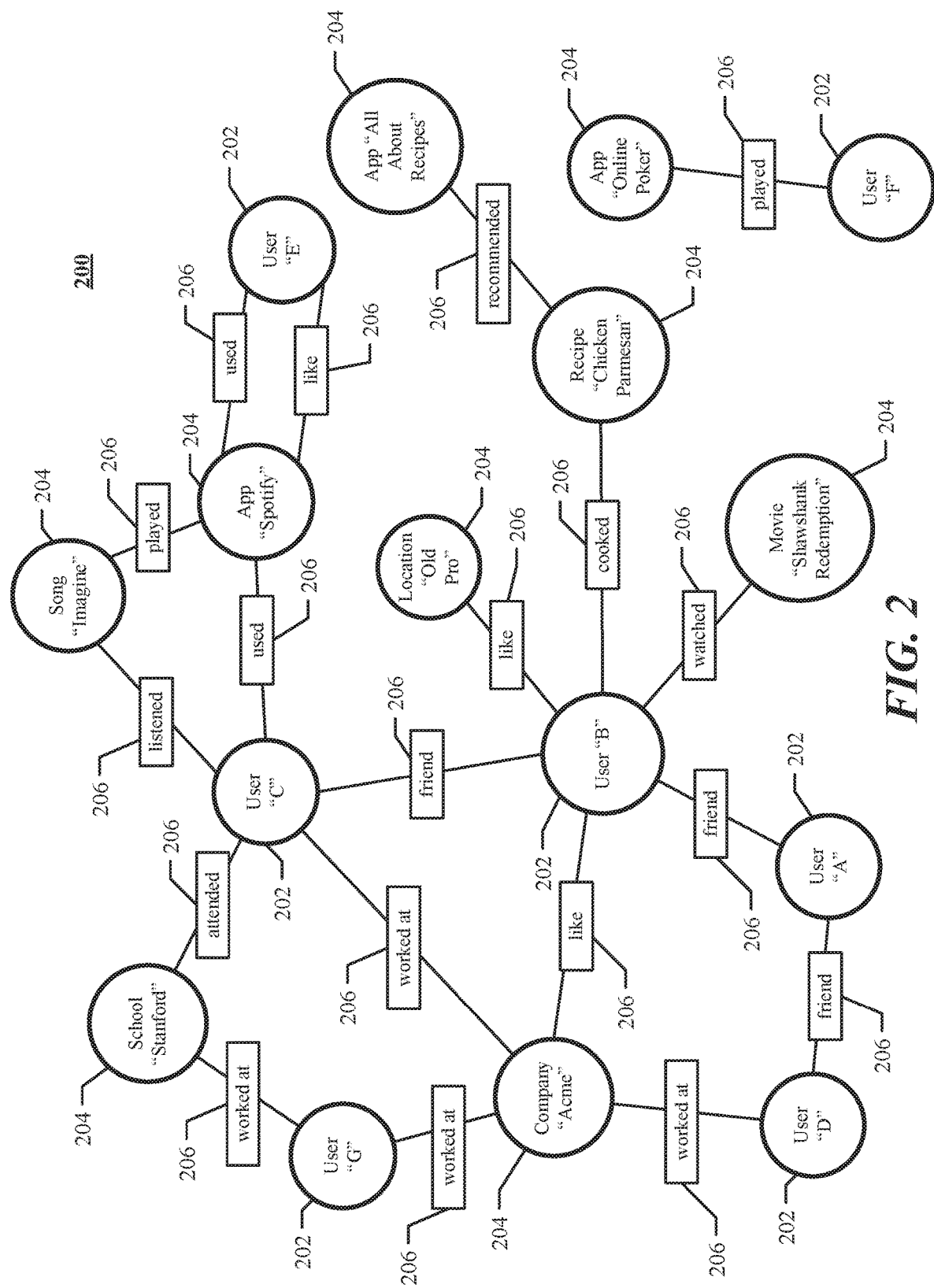
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a web site (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B."

Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between the concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Mobile Client System

Figure 3:
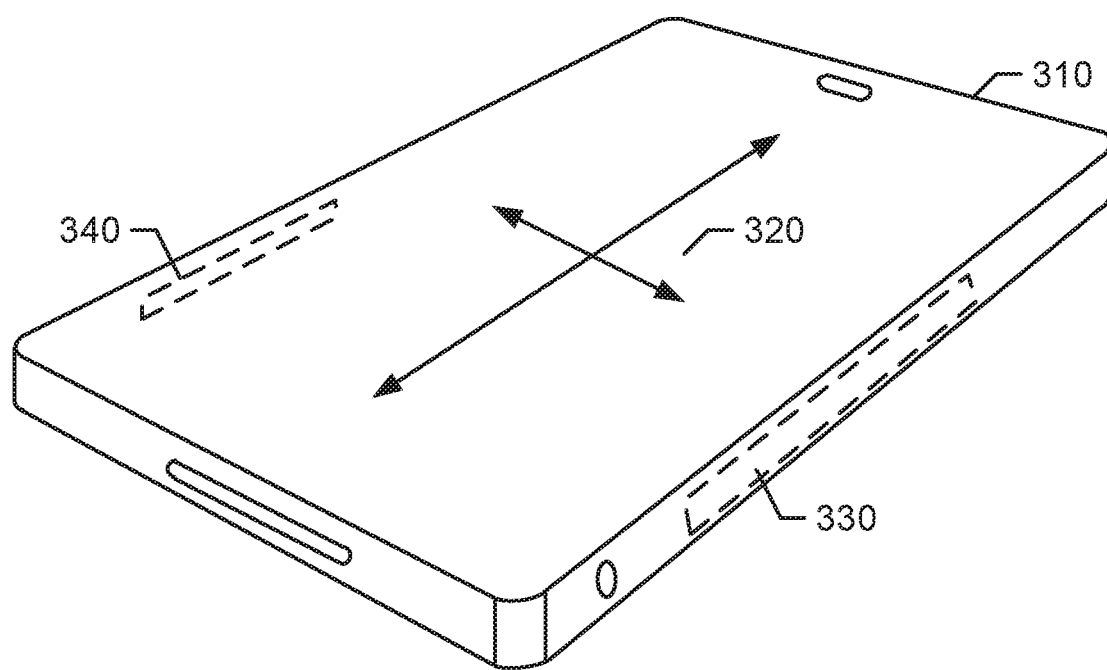
FIG. 3 illustrates an example mobile client system.

FIG. 3 illustrates an example mobile client system 130. This disclosure contemplates mobile client system 130 taking any suitable physical form. In particular embodiments, mobile client system 130 may be a computing system as described below. As example and not by way of limitation, mobile client system 130 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile client system 130 may have a display screen 310 and a touch sensor 320 as an input component. In the example of FIG. 3, touch sensor 320 is incorporated on a front surface (e.g., display screen 310) of mobile client system 130. Touch sensor 320 may detect the presence and location of a touch (e.g., from a finger of a user) or the proximity of an object (e.g., a stylus). In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In particular embodiments, a user may be presented with a user interface ("UI") of one or more applications (e.g., mobile applications) on screen display 310 of mobile client system 130, and the user may interact with the UI of each of the applications via touch sensor 320.

In the example of FIG. 3, one or more antennae 330, 340 may be incorporated into one or more sides of mobile client system 130. Antennae 330, 340 are components that convert electric current into radio waves, and vice versa. During transmission of signals, a transmitter applies an oscillating radio frequency (RF) electric current to terminals of antenna 330, 340, and antenna 330, 340 radiates the energy of the applied the current as electromagnetic (EM) waves. During reception of signals, antennae 330, 340 convert the power of an incoming EM wave into a voltage at the terminals of antennae 330, 340. The voltage may be transmitted to a receiver for amplification.

In particular embodiments, mobile client system 130 many include a communication component coupled to antennae 330, 340 for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component for it. As an example and not by way of limitation, mobile client system 130 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile client system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile client system 130 may include any suitable communication component for any of these networks, where appropriate.

In particular embodiments, the communication component coupled to antennae 330, 340 of mobile client system 130 may be configured to determine location data based on global positioning system (GPS) signals, cellular triangulation, wireless hotspots, or any suitable methods for determining location data. In particular embodiments, the location service of mobile client system 130 may use one or more methods of location determination, such as for example, using the location of one or more cellular towers, crowd-sourced location information associated with a WI-FI hotspot, or a GPS function of mobile client system 130. As an example and not by way of limitation, the application may use GPS data as the primary source of location information depending at least in part on whether mobile client system 130 is able to acquire GPS data within a predetermined period of time. As another example, if mobile client system 130 is unable to acquire the GPS data within the pre-determined sampling duration, the application may use the location determined using one or more cellular towers or WI-FI hotspots. Although this disclosure describes a location service using particular methods of location determination, this disclosure contemplates a location service using any suitable method or combination of methods of location detection.

Grouping Content Based on Geographic Data

In particular embodiments, social-networking system 160 may simplify content sharing among users by accessing content from client system 130 (e.g., photographs, video files, audio files, posts, comments, holograms, virtual reality spaces, other suitable content, or any combination thereof, determining one or more groups of content that were likely part of a discrete event (e.g., a trip that lasts longer than a day) such that the user would be interested in sharing these groups of content on the online social network and with other users (e.g., with other users who were also on the trip, with the user's friends and/or connections on the online social network, and/or publicly via the online social network), and then presenting recommendations to the user of these groups of content each with a recommended name describing the discrete event so as to facilitate the sharing of the content with other users and on the online social network.

The application is an extension of U.S. patent application Ser. No. 14/566,524, filed 10 Dec. 2014, U.S. patent application Ser. No. 14/656,974, filed 13 Mar. 2015, U.S. patent application Ser. No. 14/706,921, filed 7 May 2015, U.S. patent application Ser. No. 12/922,984, filed 15 Feb. 2011, issued as U.S. Pat. No. 8,666,198 on 4 Mar. 2014, and U.S. patent application Ser. No. 13/906,148, filed 30 May 2013, issued as U.S. Pat. No. 9,143,573 on 22 Sep. 2015, all incorporated by reference herein. These applications describe accessing content on a user's mobile device based on when the content was taken and/or saved to the user's mobile device and who was in them (e.g., determined based on facial recognition technology) within a discrete time period of a single day. For example, these applications describe a method in which social-networking system 160 would access the user's content and suggest "moments" of content (e.g., photographs) to be shared with other users, the "moments" lasting between a couple of hours to a full day. In contrast, this application looks beyond these "moments" to determine whether a group of content associated with several days are part of a discrete event (e.g., a "trip," which may include multiple "moments").

In particular embodiments, social-networking system 160 looks beyond content associated with a single day to determine content that may be part of a multiple-day, multiple-location trip. In addition, social-networking system 160 may determine the occurrence of a multiple-day, multiple-location trip by analyzing content associated with "abnormal" locations (e.g., locations that are a predetermined distance away from the user's usual or "hotspot" locations, determined as discussed in U.S. patent application Ser. No. 14/323,015, filed 4 Jan. 2016, incorporated by reference herein), and then ranking the content based on how likely the user would want to share particular groups of the content, rather than simply sharing the content in chronological order. Then, the ranked results are displayed to the user with content-group names and/or descriptions suggested based on the narrowest geographic granularity associated with the most amount of content.

Figure 4:
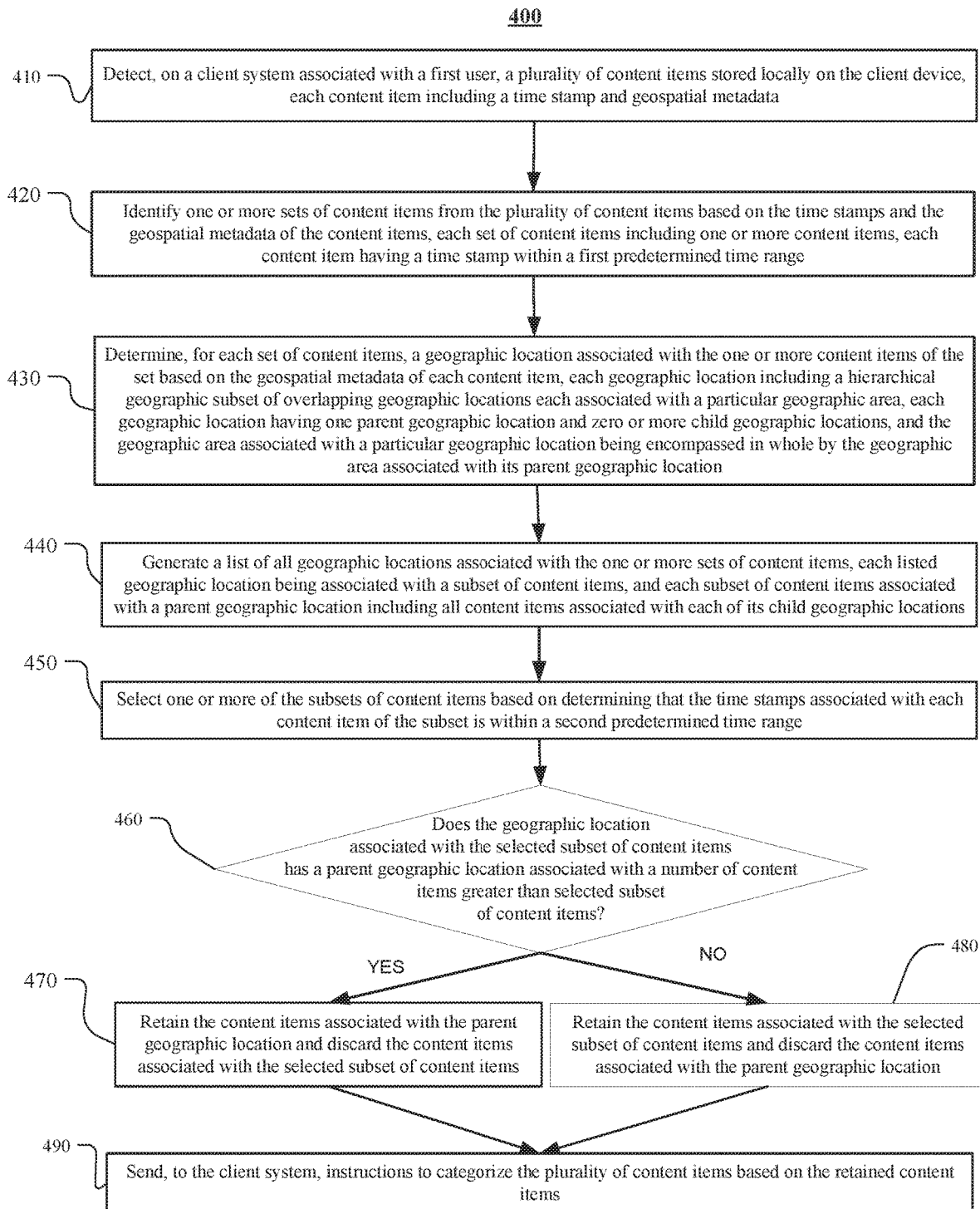
FIG. 4 illustrates an example method for identifying a plurality of content items and sending, to a client system, instructions to categorize the plurality of content items into one or more subsets of content items for sharing on an online social network.
Figure 5:
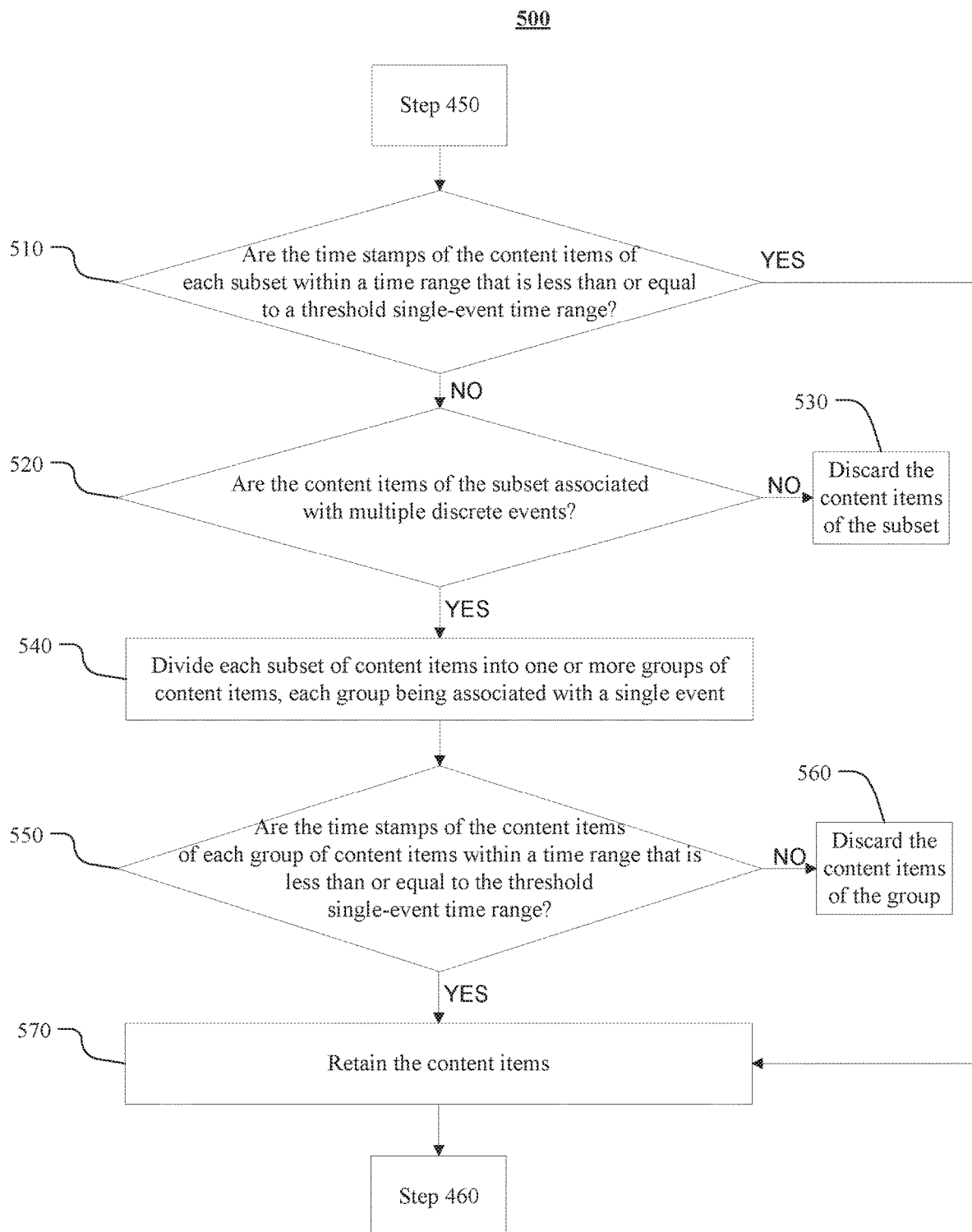
FIG. 5 illustrates an example method for selecting one or more of the subsets of content items based on the time stamps associated with each content item of the subset.

As discussed in more detail below, FIG. 4 illustrates an example method 400 for identifying a plurality of content items and sending, to a client system, instructions to categorize the plurality of content items into one or more subsets of content items for sharing on an online social network, FIG. 5 illustrates an example method 500 for selecting one or more of the subsets of content items based on the time stamps associated with each content item of the subset, and FIGS. 6-11 illustrate an example embodiment of categorizing the plurality of content items into one or more subsets of content items for sharing on the online social network. The methods illustrated in FIGS. 4 and 5 will first be generally discussed, and then will be discussed in conjunction with the example embodiment illustrated in FIGS. 6-11 below.

As shown in FIG. 4, the method may begin at step 410, where social-networking system 160 may detect, on mobile client system 130 associated with a first user, a plurality of content items stored locally on the client device, wherein each content item comprises a time stamp and geospatial metadata. At step 420, social-networking system 160 may identify one or more sets of content items from the plurality of content items based on the time stamps and the geospatial metadata of the content items, wherein each set of content items comprises one or more content items, and wherein each content item in each set of content items has a time stamp within a first predetermined time range. At step 430, social-networking system 160 may determine, for each set of content items, a geographic location associated with the one or more content items of the set based on the geospatial metadata of each content item, wherein each geographic location comprises a hierarchical geographic subset of overlapping geographic locations each associated with a particular geographic area, and wherein each geographic location has one parent geographic location and zero or more child geographic locations, and wherein the geographic area associated with a particular geographic location is encompassed in whole by the geographic area associated with its parent geographic location. At step 440, social-networking system 160 may generate a list of all geographic locations associated with the one or more sets of content items, each listed geographic location being associated with a subset of content items, wherein each subset of content items associated with a parent geographic location comprises all content items associated with each of its child geographic locations. At step 450, social-networking system 160 may select one or more of the subsets of content items based on determining that the time stamps associated with each content item of the subset is within a second predetermined time range. At step 460, social-networking system 160 may determine, for each selected subset of content items, whether the geographic location associated with the selected subset of content items has a parent geographic location associated with a number of content items greater than the selected subset of content items. In step 460, if the determination is YES, that is, if it is determined that the geographic location associated with a selected first subset of content items has a parent geographic location of a selected second subset that is associated with a number of content items greater than the selected first subset of content items, then the method moves to step 470 in which social-networking system 160 may retain the content items associated with the parent geographic location and discard the content items associated with the selected subset of content items (e.g., retain the content items of the second subset and discard the content items of the first subset). On the other hand, in step 460, if the determination is NO, that is, if it is determined that the geographic location associated with a selected first subset of content items does not have a parent geographic location of a selected second subset that is associated with a number of content items greater than the selected first subset of content items, then the method moves to step 480 in which social-networking system 160 may retain the content items associated with the selected subset of content items and discard the content items associated with the parent geographic location (e.g., retain the content items of the first subset and discard the content items of the second subset). Then, at step 490, social-networking system 160 may send, to mobile client system 130, instructions to categorize the plurality of content items based on the retained content items.

As shown in FIG. 5, in further clarifying step 450, the method may begin at step 510, where social-networking system 160 may determine whether the time stamps of the content items of each subset are within a time range that is less than or equal to a threshold single-event time range. If the determination at step 510 is YES, then the method moves to step 570 in which social-networking system 160 may retain the content items (e.g., the content items of the subset) before moving on to step 460 of FIG. 4. If the determination at step 510 is NO, then the method moves to step 520 in which social-networking system 160 may determine whether the content items of the subset are associated with multiple discrete events. Proceeding to step 520, if the determination at step 520 is NO, then the method moves to step 530 in which social-networking system 160 may discard the content items of the subset. If the determination at step 520 is YES, then the method moves to step 540 in which social-networking system 160 may divide each subset of content items into one or more groups of content items, each group being associated with a single event. Then, at step 550, social-networking system 160 may determine whether the time stamps of the content items of each group of content items are within a time range that is less than or equal to the threshold single-event time range. If the determination at step 550 is YES, then the method moves to step 560 in which social-networking system 160 may discard the content items of the group. If the determination at step 550 is YES, then the method moves to step 570 in which social-networking system 160 may retain the content items (e.g., the content items of the group) before moving on to step 460 of FIG. 4.

Particular embodiments may repeat one or more steps of the methods of FIGS. 4 and 5, where appropriate. Although this disclosure describes and illustrates particular steps of the methods of FIGS. 4 and 5 as occurring in a particular order, this disclosure contemplates any suitable steps of the methods of FIGS. 4 and 5 occurring in any suitable order. Moreover, although this disclosure describes and illustrates an example method for identifying a plurality of subsets of content items based on particular criteria including the particular steps of the methods of FIGS. 4 and 5, this disclosure contemplates any suitable method for identifying a plurality of content items based on particular criteria including any suitable steps, which may include all, some, or none of the steps of the methods of FIGS. 4 and 5, where appropriate. Furthermore, although this disclosure describes and illustrates particular components, devices, or systems carrying out particular steps of the methods of FIGS. 4 and 5, this disclosure contemplates any suitable combination of any suitable components, devices, or systems carrying out any suitable steps of the methods of FIGS. 4 and 5.

As discussed above, in particular embodiments, social-networking system 160 may detect, on mobile client system 130 associated with a first user, a plurality of content items stored locally on the client device. Each content item may include a time stamp, geospatial metadata. The time stamp may be associated with when the content item was produced (e.g., the date when a photograph or video was taken). The geospatial metadata may include information on various different granularities of geographic areas associated with a particular geographic location (e.g., landmark/point-of-interest name, city, state, country, planet, other suitable granularity of geographic location, or any combination thereof). Each geographic location may include a hierarchical geographic subset of overlapping geographic locations each associated with a particular geographic area, and each geographic location has one parent geographic location and zero or more child geographic locations. The geographic area associated with a particular geographic location is encompassed in whole by the geographic area associated with its parent geographic location. In addition, when the geographic location has at least one child geographic location, the geographic area associated with a particular geographic location is larger than the geographic area associated with the at least one child geographic location. As an example, the geographic location associated with a content item may include information on the city, the state, and the country such as "Anaheim, Calif., United States," as discussed below with regard to FIG. 6. In this example, California (the state) is a parent geographic location of Anaheim (the city)

because it overlaps, encompasses in whole, and extends beyond the geographic area of Anaheim, and United States (the country) is a parent geographic location of California because it overlaps, encompasses in whole, and extends beyond the geographic area of California. In addition, California is the child geographic location of United States because California encompasses a smaller geographic area than the United States, Anaheim is the child geographic location of California because Anaheim encompasses a smaller geographic area than the California (and the United States), and Anaheim has child geographic locations of its own in this example. In particular embodiments, additional granularities of child geographic locations (e.g., Disneyland) or parent geographic locations (e.g., Earth) may be utilized. Explained another way, social-networking system 160 may access a map, wherein the map comprises N levels of geographic locations organized in a tree-data structure having a root node at level 1 corresponding to the map and a plurality of child nodes corresponding to a plurality of geographic locations, and for each level m of levels 2 to N, for each geographic location in level m, determine that the geographic location has a parent node corresponding to a geographic location in level m−1 that encompasses the geographic location in level m, and determine that the geographic location has zero or more child nodes corresponding to zero or more geographic locations in level m+1 encompassed by the geographic location in level m. The geographic location may be determined by GPS signals, cellular triangulation, wireless hotspots, or any suitable methods for determining location data via antennae 330, 340 of mobile client system 130. Each content item may also include one or more entities tagged in the content item, and a social tag associated with each of the one or more tagged entities, wherein each social tag corresponds to an edge in the social graph connecting an entity node corresponding to the tagged entity to a content node corresponding to the content item. In addition, as discussed above, the plurality of content items comprises one or more photographs, video files, audio files, posts, comments, holograms, virtual reality spaces, or any combination thereof. In particular embodiments, the plurality of content items may be stored on or uploaded by a user's mobile device.

Figure 6:
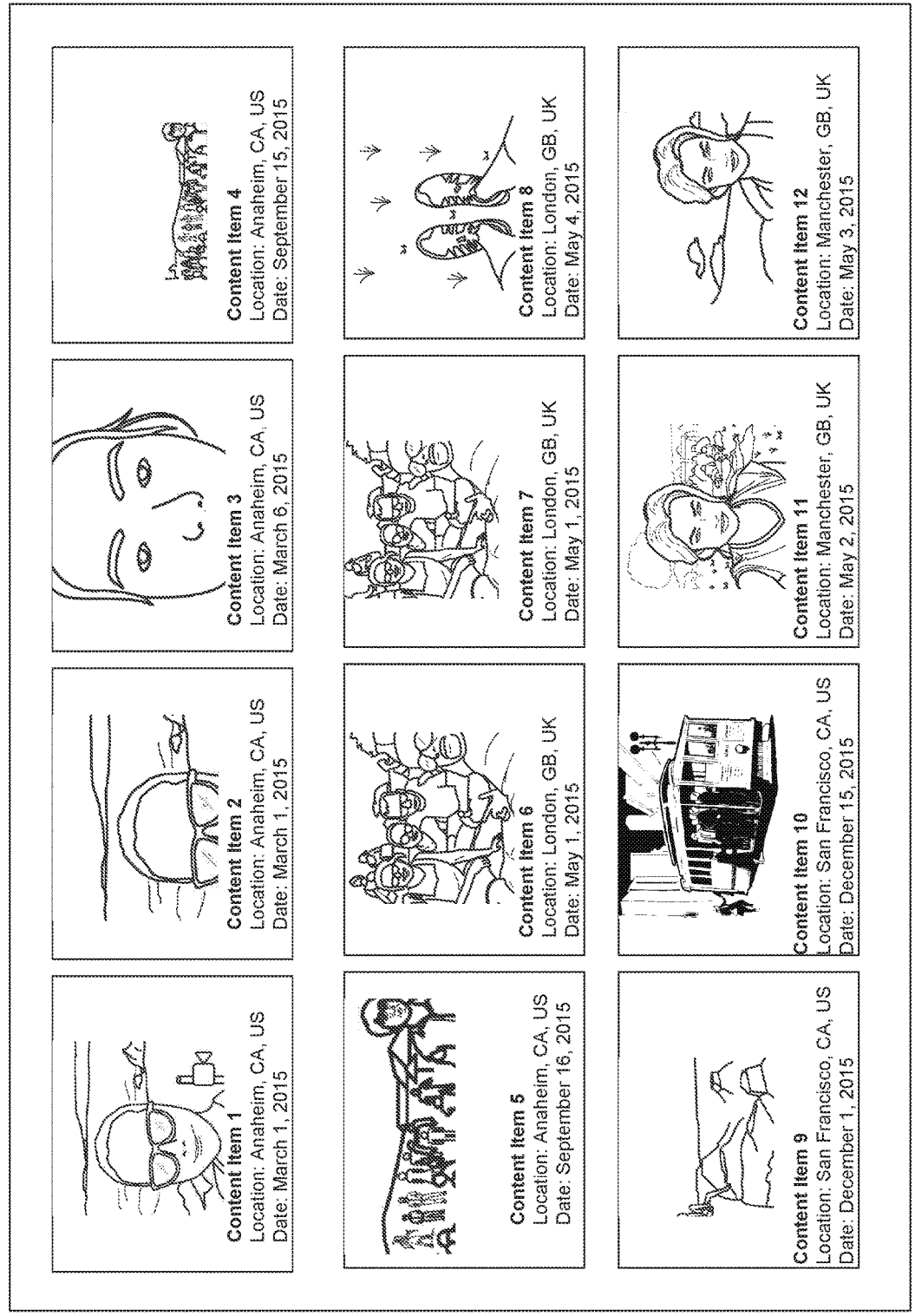
FIGS. 6-11 illustrate an example embodiment of categorizing the plurality of content items into one or more subsets of content items for sharing on the online social network.

As shown in FIG. 6, a plurality of content items 600 (e.g., detected from mobile client system 130) include Content Items 1-12. Content Item 1 may correspond to a video, and Content Items 2-12 may correspond to various photographs. As an example and not by way of limitation, Content Item 1 is associated with the location "Anaheim, Calif., United States," and with the date of Mar. 1, 2015; Content Item 2 is associated with the location "Anaheim, Calif., United States," and with the date of Mar. 1, 2015; Content Item 3 is associated with the location "Anaheim, Calif., United States," and with the date of Mar. 6, 2015; Content Item 4 is associated with the location "Anaheim, Calif., United States," and with the date of Sep. 15, 2015; and Content Item 5 is associated with the location "Anaheim, Calif., United States," and with the date of Sep. 16, 2015. As another example and not by way of limitation, Content Item 6 is associated with the location "London, Great Britain, United Kingdom," and with the date of May 1, 2015; Content Item 7 is associated with the location "London, Great Britain, United Kingdom," and with the date of May 1, 2015; Content Item 8 is associated with the location "London, Great Britain, United Kingdom," and with the date of May 4, 2015. As another example and not by way of limitation, Content Item 9 is associated with the location "San Francisco, Calif., United States," and with the date of Dec. 1, 2015; and Content Item 10 is associated with the location "San Francisco, Calif., United States," and with the date of Dec. 15, 2015. As another example and not by way of limitation, Content Item 11 is associated with the location "Manchester, Great Britain, United Kingdom," and with the date of May 2, 2015; and Content Item 12 is associated with the location "Manchester, Great Britain, United Kingdom," and with the date of May 3, 2015. Although this disclosure describes detecting content items in a particular manner, this disclosure contemplates detecting content items in any suitable manner.

Figure 7:
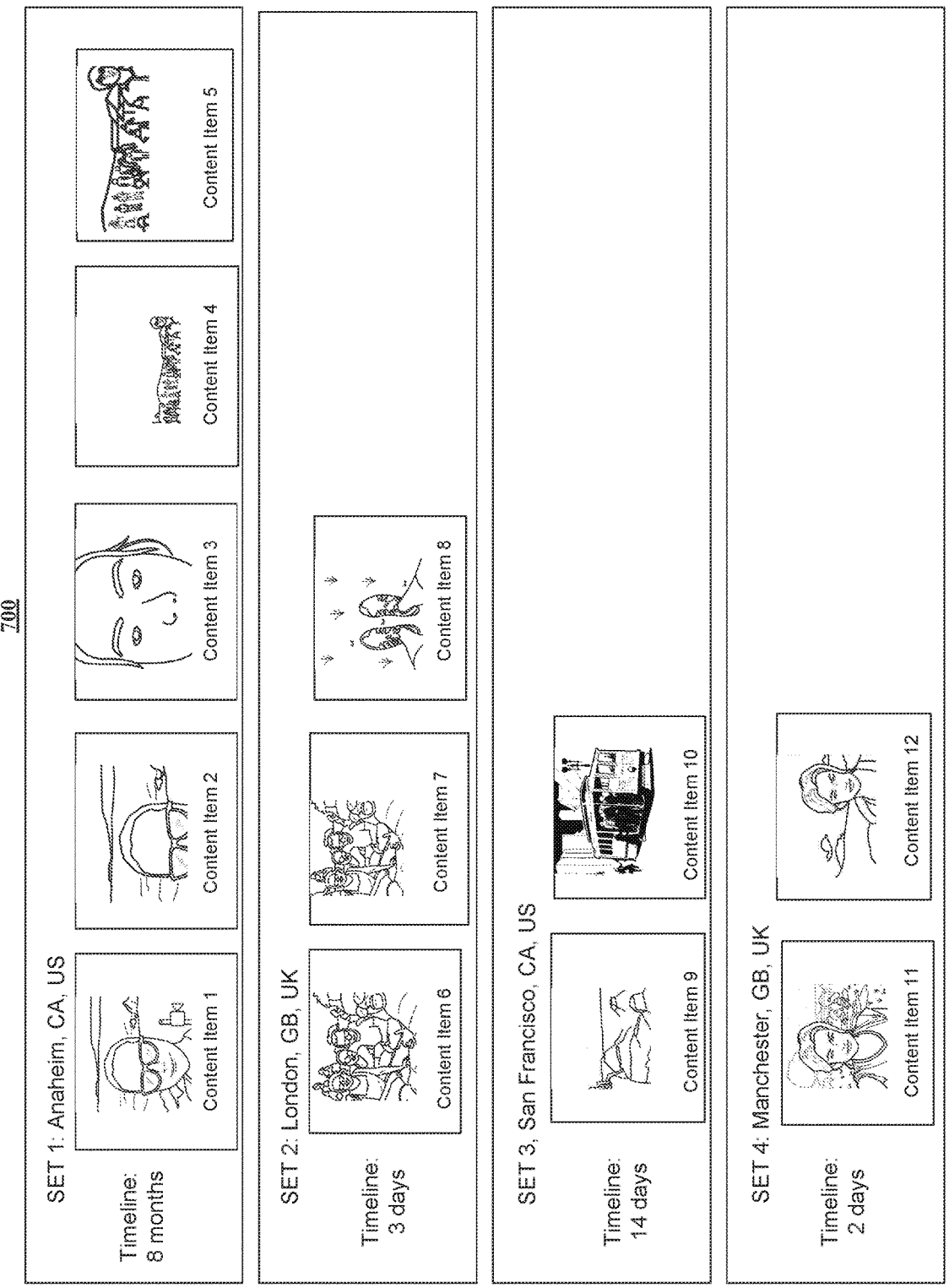

In particular embodiments, social-networking system 160 may identify one or more sets of content items from the plurality of content items based on the time stamps and geospatial metadata of the content items, and then determine, for each set of content items, a geographic location associated with the one or more content items of the set based on the geospatial metadata of each content item. Each set of content items may include one or more content items, and each content item in each set of content items may have a time stamp within a first predetermined time range. In addition, the geographic location associated with each of the content items may be determined based on the geospatial metadata, as discussed above. The first predetermined time range may be defined by the user, social-networking system 160, third-party system 170, or any combination thereof. As an example and not by way of limitation, the first predetermined time range may correspond to a "trip time range" that is more than just a "moment" of less than a day, and may be associated with any range greater than one (1) day and less than 365 days. As shown in FIG. 7, a plurality of sets of content items 700 may include Set 1, which is associated with the geographic location of Anaheim, Calif., United States and the timeline of 8 months (e.g., determined based on the difference between the date associated with the earliest content item and the most recent content of the set, and also determining that the time range is within the trip time range), and includes Content Items 1-5; Set 2, which is associated with the geographic location of London, Great Britain, United Kingdom, and the timeline of 3 days, and includes Content Items 6-8; Set 3, which is associated with the geographic location of San Francisco, Calif., United States, and the timeline of 15 days, and includes Content Items 9 and 10; and Set 4, which is associated with the geographic location of Manchester, Great Britain, United Kingdom, and the timeline of 2 days, and includes Content Items 11 and 12. Although this disclosure describes identifying one or more sets of content items in a particular manner, this disclosure contemplates identifying one or more sets of content items in any suitable manner.

Figure 8:
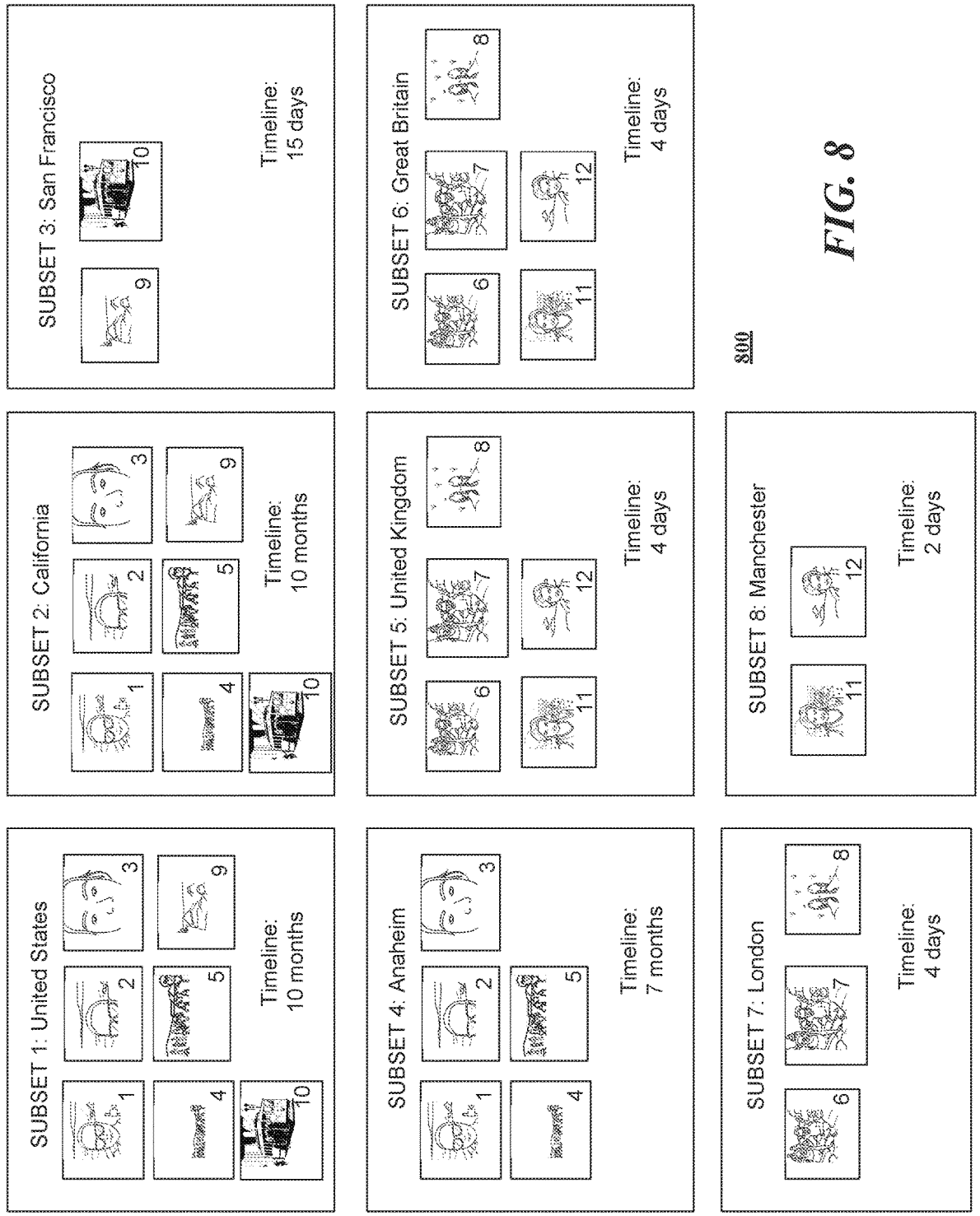

In particular embodiments, social-networking system 160 may generate a list of all geographic locations associated with the one or more sets of content items, each listed geographic location being associated with a subset of content items. As an example and not by way of limitation, the list of all geographic locations may include the geographic locations associated with each level of granularity of a geographic area. In addition, each subset of content items associated with a parent geographic location may include all content items associated with each of its child geographic locations. As shown in FIG. 8, Content Items 1-12 are associated with eight unique geographic locations: United States, California, San Francisco, Anaheim, United Kingdom, Great Britain, London, and Manchester. Each listed geographic location is associated with a subset of the plurality of the content items. As shown in FIG. 8, a plurality of subsets of content items 800 include Subset 1, which is associated with the geographic location of United States and the timeline of 8 months (e.g., determined based on the difference between the date associated with the earliest content item and the most recent content of the subset), and includes Content Items 1-5, 9, and 10; Subset 2, which is associated with the geographic location of California and the timeline of 10 months, and includes Content Items 1-5, 9, and 10; Subset 3, which is associated with the geographic location of San Francisco and the timeline of 15 days, and includes Content Items 9 and 10; and Subset 4, which is associated with the geographic location of Anaheim and the timeline of 7 months, and includes Content Items 1-5. As discussed above, each subset of content items associated with a parent geographic location includes all content items associated with each of its child geographic locations. As an example and not by way of limitation, the parent geographic location of United States includes child geographic locations of California, San Francisco, and Anaheim. Thus, Subset 1 associated with United States includes all content items associated with the child geographic locations of California, San Francisco, and Anaheim. As another example and not by way of limitation, the parent geographic location of California includes child geographic locations of San Francisco and Anaheim. Thus, Subset 2 associated with California includes all content items associated with the child geographic locations of San Francisco and Anaheim. As another example and not by way of limitation, Anaheim is not a parent geographic location of San Francisco, and vice versa, so the content items associated with each of these geographic locations remain in separate subsets. The plurality of subsets of content items 800 also includes Subset 5, which is associated with the geographic location of United Kingdom and the timeline of 4 days (e.g., determined based on the difference between the date associated with the earliest content item and the most recent content of the subset), and includes Content Items 6-8, 11, and 12; Subset 6, which is associated with the geographic location of Great Britain and the timeline of 4 days, and includes Content Items 6-8, 11, and 12; Subset 7, which is associated with the geographic location of London and the timeline of 4 days, and includes Content Items 6-8; and Subset 8, which is associated with the geographic location of Manchester and the timeline of 2 days, and includes Content Items 11 and 12. Again, as discussed above, each subset of content items associated with a parent geographic location includes all content items associated with each of its child geographic locations. As an example and not by way of limitation, the parent geographic location of United Kingdom includes child geographic locations of Great Britain, London, and Manchester. Thus, Subset 5 associated with United Kingdom includes all content items associated with the child geographic locations of Great Britain, London, and Manchester. As another example and not by way of limitation, the parent geographic location of Great Britain includes child geographic locations of London and Manchester. Thus, Subset 6 associated with Great Britain includes all content items associated with the child geographic locations of London and Manchester. As another example and not by way of limitation, London is not a parent geographic location of Manchester, and vice versa, so the content items associated with each of these geographic locations remain in separate subsets. Although this disclosure describes generating subsets of content items in a particular manner, this disclosure contemplates generating subsets of content items in any suitable manner.

Figure 9:

In particular embodiments, social-networking system 160 may select one or more of the subsets of content items based on determining that the time stamps associated with each content item of the subset is within a second predetermined time range, the second predetermined time range being different from the first predetermined time range. The second predetermined time range may be defined by the user, social-networking system 160, third-party system 170, or any combination thereof. As an example and not by way of limitation, the second predetermined time range may correspond to a "sub-trip time range" that is defined by whether the sub-trip time range falls within a single-event time range (e.g., between 2 to 7 days), or alternatively, is associated with multiple discrete events that occurred over 6 months and included discrete, single events that fall within the time range of 2 to 7 days. For further clarification, this determination is discussed in conjunction with the method 500 of FIG. 5 and the embodiment shown in FIGS. 9-11. As shown in FIG. 5, in step 510, social-networking system 160 may determine whether the time stamps of the content items of each subset are within a time range that is less than or equal to a threshold single-event time range. The threshold single-event time range may be defined by the user, social-networking system 160, third-party system 170, or any combination thereof. As an example and not by way of limitation, as discussed above, the threshold single-event time range may correspond to a time range between 2 to 7 days. If the determination at step 510 is YES, then the method moves to step 570 in which social-networking system 160 may retain the content items (e.g., the content items of the subset) before moving on to step 460 of FIG. 4. As shown in FIG. 9, Subset 5 is associated with a timeline of 4 days, Subset 6 is associated with a timeline of 4 days, Subset 7 is associated with a timeline of 4 days, and Subset 8 is associated with a timeline of 2 days. Thus, at step 510, social-networking system 160 may retain the content items of Subsets 5-8 (e.g., as indicated by the "KEEP" stamp on these subsets).

On the other hand, as shown in FIG. 5, if the determination at step 510 is NO, then the method moves to step 520 in which social-networking system 160 may determine whether the content items of the subset are associated with multiple discrete events. In particular embodiments, whether content items are associated with multiple discrete events may be determined based on the time stamps associated with each content item of the subsets being within a time range that is greater than a threshold multi-event time range. The threshold multi-event time range may be defined by the user, social-networking system 160, third-party system 170, or any combination thereof. The threshold multi-event range may correspond to a time range in which content items separated by this threshold multi-event time range may be analyzed as being associated with two or more separate and discrete events. As an example and not by way of limitation, the threshold multi-event time range may correspond to a range between 6 to 12 months, and thus a subset of content items associated with an 8-month timeline may be analyzed to determine whether they correspond to two or more separate and discrete events such that the content items may be separated into groups associated with each of these separate and discrete events. As shown in FIG. 5, if the determination at step 520 is NO, then the method moves to step 530 in which social-networking system 160 may discard the content items of the subset. As shown in FIG. 9, Subset 3 is associated with a timeline of 15 days. Thus, at step 520, social-networking system 160 may discard the content items of Subset 3 (e.g., as indicated by the "DISCARD" stamp on this subset).

Figure 10:
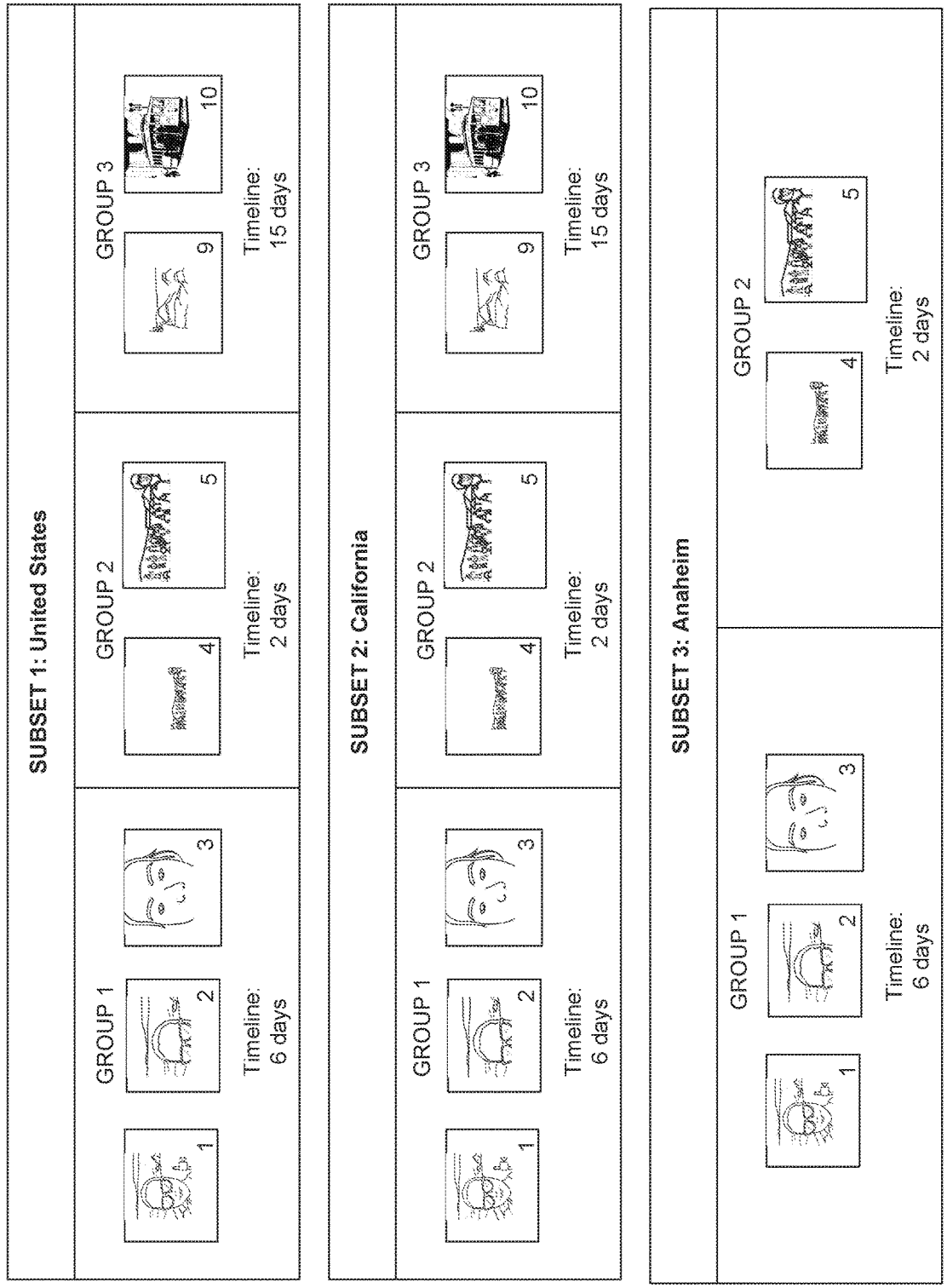

On the other hand, as shown in FIG. 5, if the determination at step 520 is YES, then the method moves to step 540 in which social-networking system 160 may divide each subset of content items into one or more groups of content items, each group being associated with a single event. As shown in FIG. 9, Subset 1 is associated with a timeline of 10 months, Subset 2 is associated with a time of 10 months, and Subset 4 is associated with a timeline of 7 months. Thus, at step 520, social-networking system 160 may further analyze these subsets by dividing each subset of content items into one or more groups of content items (e.g., as shown by the "BREAK DOWN" stamp on these subsets). Then, as shown in FIG. 10, the content items of each subset are organized to one or more groups of content items 1000 based on a threshold proximity in the time stamps associated with the content items of the group (e.g., the time stamps associated with each content item of the group are less than or equal to the threshold multi-event time range of 6-12 months). In addition, each group of content items is associated with a single event, which may be determined based on the geospatial metadata (e.g., specific geographic location, specific GPS coordinates, distance from the user's usual or "hotspot" locations, distance between the locations associated with multiple content items, etc.), the one or more entities tagged in a content item and a social tag associated with the entities, other relevant content-item information, or any combination thereof. As shown in FIG. 10, the content items associated with Subset 1 corresponding to the geographic location of United States are further divided into Group 1, including Content Items 1-3 and associated with a timeline of 6 days; Group 2, including Content Items 4 and 5 and associated with a timeline of 2 days; and Group 3, including Content Items 9 and 10 and associated with a timeline of 15 days. The content items associated with Subset 2 corresponding to the geographic location of California are further divided into Group 1, including Content Items 1-3 and associated with a timeline of 6 days; Group 2, including Content Items 4 and 5 and associated with a timeline of 2 days; and Group 3, including Content Items 9 and 10 and associated with a timeline of 15 days. In addition, the content items associated with Subset 3 corresponding to the geographic location of Anaheim are further divided into Group 1, including Content Items 1-3 and associated with a timeline of 6 days; and Group 2, including Content Items 4 and 5 and associated with a timeline of 2 days.

Figure 11:
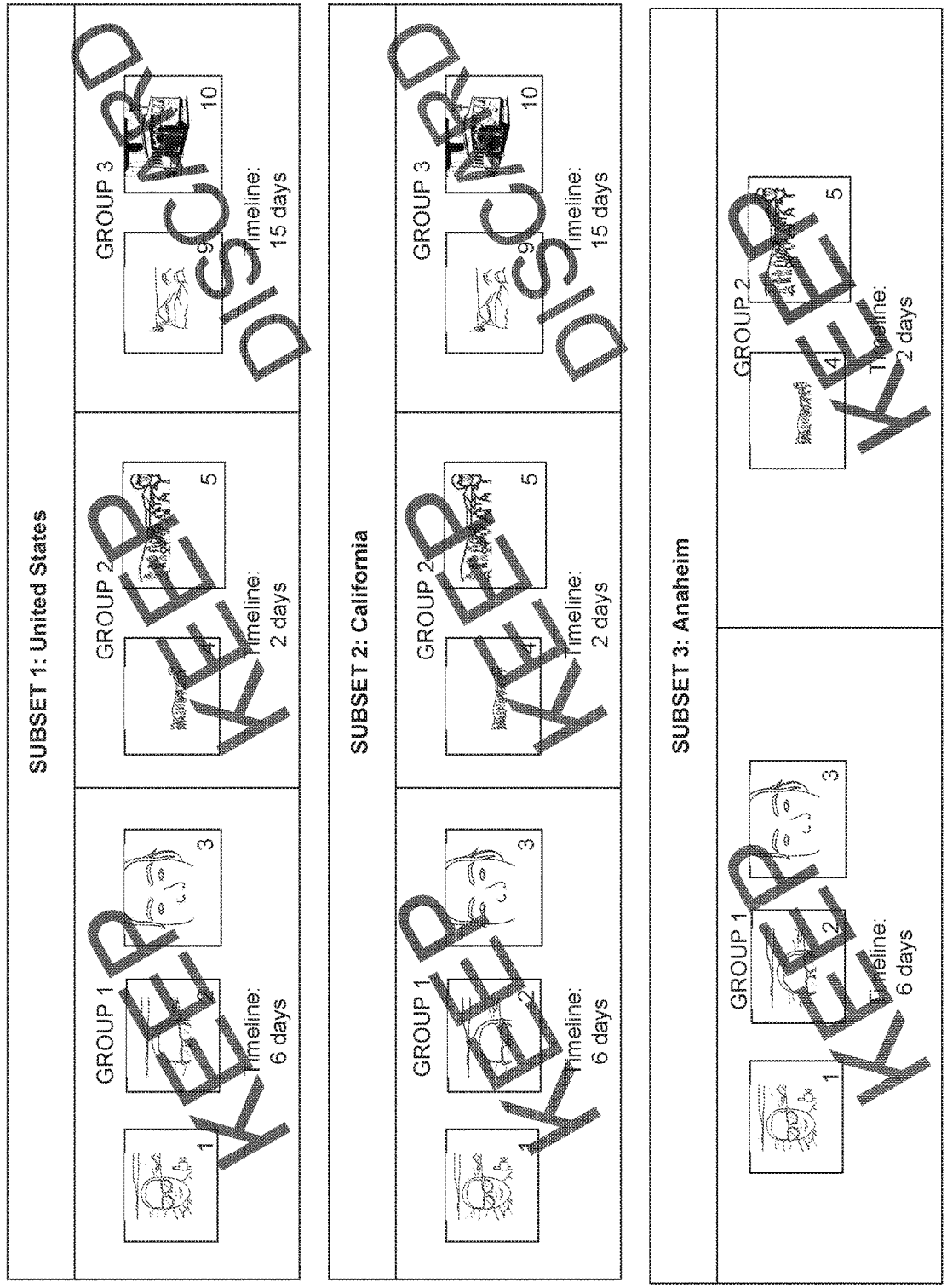

Then, as shown in FIG. 5, at step 550, social-networking system 160 may determine whether the time stamps of the content items of each group of content items are within a time range that is less than or equal to the threshold single-event time range (e.g., 2-7 days). If the determination at step 550 is YES, then the method moves to step 560 in which social-networking system 160 may discard the content items of the group. FIG. 11 shows the disposition of the one or more groups of content items 1100. As shown in FIG. 11, Group 3 of Subset 1 is associated with a timeline of 15 days, and Group 3 of Subset 2 is associated with a timeline of 15 days. Thus, social-networking system 160 may discard the content items of Group 3 of Subset 1 and Group 3 of Subset 2 (e.g., as indicated by the "DISCARD" stamp on these groups). On the other hand, as shown in FIG. 5, if the determination at step 550 is YES, then the method moves to step 570 in which social-networking system 160 may retain the content items (e.g., the content items of the group) before moving on to step 460 of FIG. 4. As shown in FIG. 11, Group 1 of Subset 1 is associated with a timeline of 6 days, Group 2 of Subset 1 is associated with a timeline of 2 days, Group 1 Subset 2 is associated with a timeline of 6 days, Group 2 of Subset 2 is associated with a timeline of 2 days, Group 1 of Subset 3 is associated with a timeline of 6 days, and Group 2 of Subset 3 is associated with a timeline of 2 days. Thus, as shown in FIG. 5, at step 550, social-networking system 160 may retain the content items of Groups 1 and 2 of Subset 1, Groups 1 and 2 of Subset 2, and Groups 1 and 2 of Subset 3 (e.g., as indicated by the "KEEP" stamp on these groups) to be processed at step 460 of FIG. 4. Although this disclosure describes retaining groups of content items in a particular manner, this disclosure contemplates retaining groups of content items in any suitable manner Described another way, in order to select the subsets of content items based on determining that the time stamps associated with each content item of the subset are within the second predetermined time range, social-networking system 160 may separate the subsets of content items into a first group of one or more subsets of content items in which the time stamps associated with each content item of the subsets are within a time range that is less than or equal to a threshold single-event time range, a second group of one or more subsets of content items in which the time stamps associated with each content item of the subsets are within a time range that is greater than the threshold single-event time range and less than or equal to a threshold multi-event time range, and a third group of one or more subsets of content items in which the time stamps associated with each content item of the subsets are within a time range that is greater than the threshold multi-event time range. As an example and not by way of limitation, social-networking system 160 may retain the one or more subsets of content items of the first group as one of the selected subsets of content items. As another example and not by way of limitation, social-networking system 160 may discard the one or more subsets of content items of the second group. As another example and not by way of limitation, social-networking system 160 may further analyze the one or more subsets of content items of the third group to determine whether one or more of the subsets of content items can be divided into one or more subgroups based on a threshold proximity in the time stamps associated with the content items of the subset. If social-networking system 160 determines that the subsets of content items can be divided into one or more subgroups, then social-networking system 160 may retain all subgroups in which each content item in the subgroup has a time stamp within the second predetermined time range. Otherwise, social-networking system 160 may discard the subsets of content items of the third group. Although this disclosure describes retaining subsets of content items in a particular manner, this disclosure contemplates retaining subsets of content items in any suitable manner.

In particular embodiments, social-networking system 160 may determine from the selected subsets of content items, one or more non-overlapping subsets of content items based on a parent geographic location associated with the selected subset. As shown in FIG. 4, at step 460, social-networking system 160 may determine, for each selected subset of content items, whether the geographic location associated with the selected subset of content items has a parent geographic location associated with a number of content items greater than the selected subset of content items. In step 460, if the determination is YES, then social-networking system 160 may retain the content items associated with the parent geographic location and discard the content items associated with the selected subset of content items (e.g., retain the content items of the second subset and discard the content items of the first subset). On the other hand, in step 460, if the determination is NO, then social-networking system 160 may retain the content items associated with the selected subset of content items and discard the content items associated with the parent geographic location (e.g., retain the content items of the first subset and discard the content items of the second subset). As shown in FIGS. 9 and 11, the subsets and groups of content that have been retained include those shown in TABLE A below.

TABLE A

| Item | Subset/ Group of Subset | Geographic Location | Timeline | No. of Content Items | Content Items Included | Final Disposition |
|---|---|---|---|---|---|---|
| 1 | Subset 5 | United Kingdom | 4 days (May 1-4, 2015) | 5 | Content Items 6-8, 11, and 12 | DISCARD |
| 2 | Subset 6 | Great Britain | 4 days (May 1-4, 2015) | 5 | Content Items 6-8, 11, and 12 | RETAIN |
| 3 | Subset 7 | London | 4 days (May 1-4, 2015) | 3 | Content Items 6-8 | DISCARD |
| 4 | Subset 8 | Manchester | 2 days (May 2-3, 2015) | 2 | Content Items 11 and 12 | DISCARD |
| 5 | Group 1 of Subset 1 | United States | 6 days (March 1-6, 2015) | 3 | Content Items 1-3 | DISCARD |
| 6 | Group 2 of Subset 1 | United States | 2 days (September 15-16, 2015) | 2 | Content Items 4 and 5 | DISCARD |
| 7 | Group 1 of Subset 2 | California | 6 days (March 1-6, 2015) | 3 | Content Items 1-3 | DISCARD |
| 8 | Group 2 of Subset 2 | California | 2 days (September 15-16, 2015) | 2 | Content Items 4 and 5 | DISCARD |
| 9 | Group 1 of Subset 3 | Anaheim | 6 days (March 1-6, 2015) | 3 | Content Items 1-3 | RETAIN |
| 10 | Group 2 of Subset 3 | Anaheim | 2 days (September 15-16, 2015) | 2 | Content Items 4 and 5 | RETAIN |

For Subsets 5-8, starting at the lowest child geographic location level, for Subset 8, at step 460 of FIG. 4, social-networking system 160 determines that the geographic location of Manchester has a parent geographic location (i.e., Great Britain) associated with a number of content items greater than the subset of content items of Manchester during a timeline that falls within the timeline of the content items of the parent geographic location, and thus retains the content items associated with the parent geographic location (i.e., Great Britain) and discard the content items associated with the selected subset of content items (i.e., Manchester). Similarly, for Subset 7, at step 460 of FIG. 4, social-networking system 160 determines that the geographic location of London has a parent geographic location (i.e., Great Britain) associated with a number of content items greater than the subset of content items of London during the same timeline as the content items of the parent geographic location, and thus retains the content items associated with the parent geographic location (i.e., Great Britain) and discard the content items associated with the selected subset of content items (i.e., London). Then, for Subset 6, at step 460 of FIG. 4, social-networking system 160 determines that the geographic location of Great Britain is associated with a parent geographic location (i.e., United Kingdom) during the same timeline as the content items of the parent geographic location, but nonetheless determines that the parent geographic location (i.e., United Kingdom) is not associated with a number of content items greater than the selected subset of content items (i.e., Great Britain), and thus social-networking system 160 retains the content items associated with the selected subset of content items (i.e., Great Britain) and discards the content items associated with the parent geographic location (i.e., United Kingdom).

For Groups 1 and 2 of each of Subsets 1-3, starting at the lowest child geographic location level, for Group 1 of Subset 3 (i.e., Item 9), at step 460 of FIG. 4, social-networking system 160 determines that the geographic location of Anaheim has two parent geographic locations (i.e., Item 7—California, and Item 5—United States), each of which is not associated with a number of content items greater than the number of content items associated with the selected group of the subset (i.e., Anaheim) during the same timeline or a timeline that falls within the timeline of the content items of the selected groups of content items (i.e., the timeline associated with Anaheim for this group is the same as the time associated with both California and United States groups of content items). Thus, social-networking system 160 discards the content items associated with the parent geographic locations of California and United States, and retains the content items associated with Anaheim of Group 1 of Subset 3. In addition, for Group 2 of Subset 3 (i.e., Item 10), at step 460 of FIG. 4, social-networking system 160 determines that the geographic location of Anaheim has two parent geographic locations (i.e., Item 8—California, and Item 6—United States), each if which is not associated with a number of content items greater than the number of content items associated with the selected group of the subset (i.e., Anaheim) during the same timeline or a timeline that falls within the timeline of the content items of the selected groups of content items (the timeline associated with Anaheim for this group is the same as the time associated with both California and United States groups of content items). Thus, social-networking system 160 discards the content items associated with the parent geographic locations of California and United States, and retains the content items associated with Anaheim of Group 2 of Subset 3. In particular, even though Group 1 of Subset 3 and Group 2 of Subset 3 are both associated with the geographic location of Anaheim, they correspond to two different, non-lapping time periods associated with separate, discrete events and thus are retained as separate groups of content items. Although this disclosure describes selecting which subsets of content items to retain and which subsets to discard in a particular manner, this disclosure contemplates selecting which subsets of content items to retain and which subsets to discard in any suitable manner.

In particular embodiments, social-networking system 160 may send, to mobile client system 130, instructions to categorize the plurality of content items into based on the retained content items (e.g., into the non-overlapping subsets of content items). The instructions to categorize the plurality of content items into the non-overlapping subsets of content items may include instructions for ranking each of the non-overlapping subsets of content items, wherein the ranking instructions are determined based on social graph information accessed from an online social networking system. As an example and not by way of limitation, certain subsets of content items may be up-ranked based on the geospatial metadata (e.g., further distances from the user's "hotspots" may more likely correspond to vacations and or other events associated with content items the user may want to share), social signals (e.g., facial detection of a number of friends of the user as indicated based on the online social network), other relevant ranking factors, or any combination thereof. In addition, the instructions to categorize the plurality of content items into the non-overlapping subsets of content items may include suggested folder names for each of the non-overlapping subsets of content items, the suggested folder names determined based at least in part on the time stamp and the geospatial metadata. As an example and not by way of limitation, for the subsets/groups listed as "retained" in TABLE A, Item 2 may include a suggest name of "Great Britain, May 2015," Item 9 may include a suggested name of "Anaheim, March 2015," and Item 10 may include a suggested name of "Anaheim, September 2015" when the subsets/groups of content items are presented to the user. In addition, other geospatial metadata, social signals, or relevant content-item information, or any combination thereof, may be used to suggested a name for the subset/group of content items. In particular embodiments, the categorizing the plurality of content items may include modifying an index on mobile client system 130 to indicate that the content items are indexed into the various subsets and/or groups, modifying the metadata of the content items to include tags indicating what subset the content item belongs to, other suitable categorizing methods, and any combination thereof. Although this disclosure describes instructions to categorize the content items in a particular manner, this disclosure contemplates instructions to categorize the content items in any suitable manner.

Systems and Methods

Figure 12:
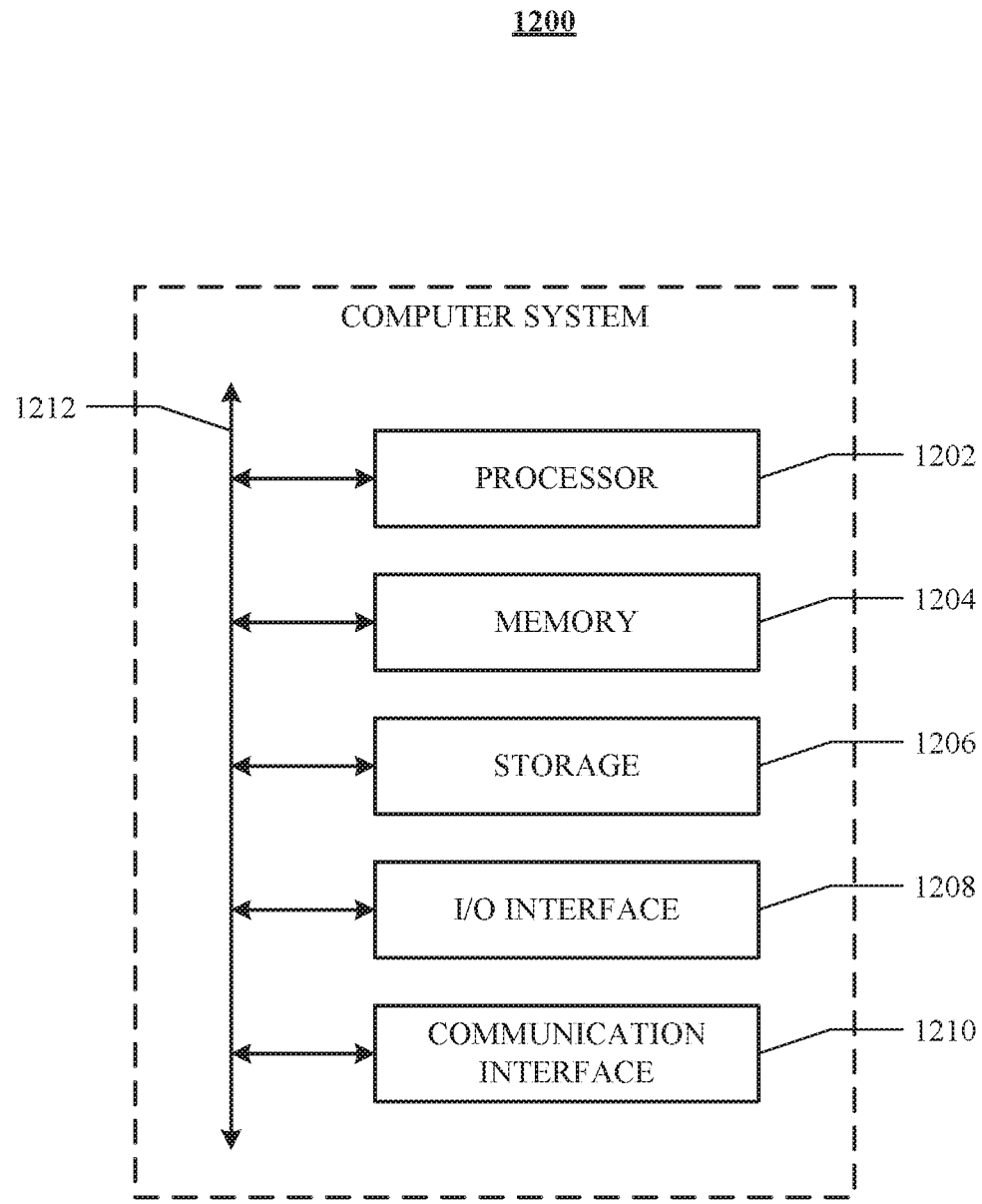
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous [70] Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices in a server system:
   at the server system, identifying a plurality of item sets of content items based on time stamps and geospatial metadata of the content items, each item set comprising a plurality of content items of the content items, wherein for each item set:
      each content item has a respective time stamp within a first predetermined time range of each other content item of the respective item set, and
      each content item has a geographic location indicated by its geospatial metadata that is within a threshold geographic area of each other content item of the respective item set;
   at the server system, generating, from the plurality of item sets, a plurality of non-overlapping item subsets, each non-overlapping item subset comprising content items from a respective identified item set of the plurality of item sets having a respective geographic location that is within a respective geographic subset associated with the geographic location, wherein the generating comprises:
      identifying that a first item set of the plurality of item sets has a parent geographic location for a second item set of the plurality of item sets;
      determining whether a first number of the content items of the first item set is greater than a second number of the content items of the second item set
      when the first number is greater than the second number, retaining the first item set as one of the plurality of non-overlapping item subsets, and discarding the second item set and
      when the first number is not greater than the second number, retaining the second item set as one of the plurality of non-overlapping item subsets and discarding the first item set; and
   sending, from the server system to a client device, instructions based on the plurality of non-overlapping item subsets, wherein the instructions are associated with the client device automatically categorizing each of the plurality of content items into each of the respective plurality of non-overlapping item subsets.

2. The method of claim 1, wherein the plurality of content items comprises one or more photographs, video files, audio files, posts, comments, holograms, virtual reality spaces, or any combination thereof.

3. The method of claim 2, wherein each content item further comprises:
   one or more entities tagged in the content item, and
   a social tag associated with each of the one or more tagged entities,
   wherein each social tag corresponds to an edge in a social graph of a social networking system connecting an entity node corresponding to the tagged entity to a content node corresponding to the content item.

4. The method of claim 1, wherein the instructions based on the plurality of non-overlapping item subsets further comprise instructions to rank each of the item subsets based on social graph information accessed from a social networking system.

5. The method of claim 1, wherein the instructions based on the plurality of non-overlapping item subsets further comprise suggested folder names for each of the item subsets, the suggested folder names determined based at least in part on the time stamp and the geospatial metadata.

6. The method of claim 1, further comprising, prior to sending the instructions based on the plurality of non-overlapping item subsets:
- selecting, from among the plurality of non-overlapping item subsets, a plurality of item subsets based on determining that the time stamps associated with each content item of each of the one or more respective item subsets are within a second predetermined time range of each other content item of the respective item subset, the second predetermined time range being different from the first predetermined time range;
- separating the selected plurality of item subsets into one or more groups including:
  - a first group of item subsets in which the time stamps associated with each content item of the item subsets are within a time range that is less than or equal to a threshold single-event time range, and
  - a second group of item subsets in which the time stamps associated with each content item of the one or more item subsets are within a time range that is greater than the threshold single-event time range and less than or equal to a threshold multi-event time range;
- retaining the content items in the first group of item subsets; and
- retaining the content items in the second group of item subsets only if the content items are associated with multiple discrete events, else discarding the content items in the second group of item subsets.

7. At least one non-transitory computer readable storage medium comprising a set of instructions which, when executed, cause a computing device in a server system to:
- identify a plurality of item sets of content items based on time stamps and geospatial metadata of the content items, each item set comprising a plurality of content items of the content items, wherein for each item set:
  - each content item has a respective time stamp within a first predetermined time range of each other content item of the respective item set, and
  - each content item has a geographic location indicated by its geospatial metadata that is within a threshold geographic area of each other content item of the respective item set;
- generate, from the plurality of item sets, a plurality of non-overlapping item subsets, each non-overlapping item subset comprising content items from a respective identified item set of the plurality of item sets having a respective geographic location that is within a respective geographic subset associated with the geographic location, wherein to generate the plurality of non-overlapping item subsets, the set of instructions which, when executed, cause the computing device to:
  - identify that a first item set of the plurality of item sets has a parent geographic location for a second item set of the plurality of item sets;
  - determine whether a first number of the content items of the first item set is greater than a second number of the content items of the second item set
  - when the first number is greater than the second number, retain the first item set as one of the plurality of non-overlapping item subsets, and discard the second item set and
  - when the first number is not greater than the second number, retain the second item set as one of the plurality of non-overlapping item subsets and discard the first item set and
- send, from the server system to a client device, instructions based on the plurality of non-overlapping item subsets, wherein the instructions are associated with the client device automatically categorizing each of the plurality of content items into each of the respective plurality of non-overlapping item subsets.

8. The at least one non-transitory computer readable storage medium of claim 7, wherein the plurality of content items comprises one or more photographs, video files, audio files, posts, comments, holograms, virtual reality spaces, or any combination thereof.

9. The at least one non-transitory computer readable storage medium of claim 8, wherein each content item further comprises:
- one or more entities tagged in the content item, and
- a social tag associated with each of the one or more tagged entities,
- wherein each social tag corresponds to an edge in a social graph of a social networking system connecting an entity node corresponding to the tagged entity to a content node corresponding to the content item.

10. The at least one non-transitory computer readable storage medium of claim 7, wherein the instructions based on the plurality of non-overlapping item subsets further comprise instructions to rank each of the item subsets based on social graph information accessed from a social networking system.

11. The at least one non-transitory computer readable storage medium of claim 7, wherein the instructions based on the plurality of non-overlapping item subsets further comprise suggested folder names for each of the item subsets, the suggested folder names determined based at least in part on the time stamp and the geospatial metadata.

12. The at least one non-transitory computer readable storage medium of claim 7, wherein the set of instructions, when executed, further cause the computing device to, prior to sending the instructions based on the plurality of non-overlapping item subsets:
- select, from among the plurality of non-overlapping item subsets, a plurality of item subsets based on determining that the time stamps associated with each content item of each of the one or more respective item subsets are within a second predetermined time range of each other content item of the respective item subset, the second predetermined time range being different from the first predetermined time range;
- separate the selected plurality of item subsets into one or more groups including:
  - a first group of item subsets in which the time stamps associated with each content item of the item subsets are within a time range that is less than or equal to
  - a threshold single-event time range, and a second group of item subsets in which the time stamps associated with each content item of the one or more item subsets are within a time range that is greater than the threshold single-event time range and less than or equal to a threshold multi-event time range;
- retain the content items in the first group of item subsets; and
- retain the content items in the second group of item subsets only if the content items are associated with multiple discrete events, else discard the content items in the second group of item sub sets.

13. A server system comprising:
a processor; and
a memory coupled to the processor comprising instructions executable by the processor, the processor operable when executing the instructions to:
identify a plurality of item sets of content items based on time stamps and geospatial metadata of the content items, each item set comprising a plurality of content items of the content items, wherein for each item set:
each content item has a respective time stamp within a first predetermined time range of each other content item of the respective item set, and
each content item has a geographic location indicated by its geospatial metadata that is within a threshold geographic area of each other content item of the respective item set;
generate, from the plurality of item sets, a plurality of non-overlapping item subsets, each non-overlapping item subset comprising content items from a respective identified item set of the plurality of item sets having a respective geographic location that is within a respective geographic subset associated with the geographic location, wherein to generate the plurality of non-overlapping item subsets, the processor:
identifies that a first item set of the plurality of item sets has a parent geographic location for a second item set of the plurality of item sets;
determines whether a first number of the content items of the first item set is greater than a second number of the content items of the second item set
when the first number is greater than the second number, retains the first item set as one of the plurality of non-overlapping item subsets, and discards the second item set and
when the first number is not greater than the second number, retains the second item set as one of the plurality of non-overlapping item subsets and discards the first item set; and
send, to a client device, instructions based on the plurality of non-overlapping item subsets, wherein the instructions are associated with the client device automatically categorizing each of the plurality of content items into each of the respective non-overlapping plurality of item subsets.

14. The server system of claim 13, wherein the plurality of content items comprises one or more photographs, video files, audio files, posts, comments, holograms, virtual reality spaces, or any combination thereof, and wherein each content item further comprises:
one or more entities tagged in the content item, and
a social tag associated with each of the one or more tagged entities,
wherein each social tag corresponds to an edge in a social graph of a social networking system connecting an entity node corresponding to the tagged entity to a content node corresponding to the content item.

15. The server system of claim 13, wherein the instructions based on the plurality of non-overlapping item subsets further comprise instructions to rank each of the item subsets based on social graph information accessed from a social networking system.

16. The server system of claim 13, wherein the instructions based on the plurality of non-overlapping item subsets further comprise suggested folder names for each of the item subsets, the suggested folder names determined based at least in part on the time stamp and the geospatial metadata.

17. The server system of claim 13, wherein the processor is further operable when executing the instructions to, prior to sending the instructions for the client device based on the plurality of non-overlapping item subsets:
select, from among the plurality of non-overlapping item subsets, a plurality of item subsets based on determining that the time stamps associated with each content item of each of the one or more respective item subsets are within a second predetermined time range of each other content item of the respective item subset, the second predetermined time range being different from the first predetermined time range;
separate the selected plurality of item subsets into one or more groups including:
a first group of item subsets in which the time stamps associated with each content item of the item subsets are within a time range that is less than or equal to a threshold single-event time range, and
a second group of item subsets in which the time stamps associated with each content item of the one or more item subsets are within a time range that is greater than the threshold single-event time range and less than or equal to a threshold multi-event time range;
retain the content items in the first group of item subsets; and
retain the content items in the second group of item subsets only if the content items are associated with multiple discrete events, else discard the content items in the second group of item sub sets.

* * * * *